(12) United States Patent
Celik et al.

(10) Patent No.: US 7,520,914 B2
(45) Date of Patent: Apr. 21, 2009

(54) NICKEL POWDER FOR USE AS ELECTRODES IN BASE METAL ELECTRODE MULTILAYERED CERAMIC CAPACITORS

(75) Inventors: Cesur Celik, Pointe-Claire (CA); Tony Addona, Verdun (CA); Gangqiang Chen, Ville St Laurent (CA)

(73) Assignee: Canadian Electronic Powders Corporation, Quebec (CA)

( * ) Notice: Subject to any disclaimer, the term of this patent is extended or adjusted under 35 U.S.C. 154(b) by 1041 days.

(21) Appl. No.: 10/204,361

(22) PCT Filed: Feb. 16, 2001
(Under 37 CFR 1.47)

(86) PCT No.: PCT/IB01/00434

§ 371 (c)(1),
(2), (4) Date: Apr. 3, 2003

(87) PCT Pub. No.: WO01/60551

PCT Pub. Date: Aug. 23, 2001

(65) Prior Publication Data

US 2005/0221088 A1   Oct. 6, 2005

Related U.S. Application Data

(60) Provisional application No. 60/183,480, filed on Feb. 18, 2000.

(51) Int. Cl.
*B22F 9/00* (2006.01)

(52) U.S. Cl. .................... 75/346; 75/10.19

(58) Field of Classification Search ............ 75/252, 75/255, 346, 10.19
See application file for complete search history.

(56) References Cited

U.S. PATENT DOCUMENTS

| 4,659,379 A | 4/1987 | Singh et al. |
| 5,532,024 A | 7/1996 | Arndt et al. |
| 6,379,419 B1 * | 4/2002 | Celik et al. .......... 75/346 |
| 6,391,084 B1 | 5/2002 | Ito et al. |

FOREIGN PATENT DOCUMENTS

| EP | 1 025 936 A1 | 8/2000 |
| JP | 10106351 * | 4/1998 |
| JP | 11-29801 | 2/1999 |
| WO | WO00/06326 | 2/2000 |
| WO | WO 00/10756 | 3/2000 |

OTHER PUBLICATIONS

Palchik, O., et al. Preparation and Characterization of Ni/NiO Composite Using Microwave Irradiation and Sonication, *from NanoStructured Materials*, vol. 11, No. 3, pp. 415-420, 1999.

* cited by examiner

*Primary Examiner*—Roy King
*Assistant Examiner*—Ngoclan T Mai
(74) *Attorney, Agent, or Firm*—Christensen O'Connor Johnson Kindness PLLC

(57) ABSTRACT

The invention relates to new and useful nickel powders, particularly powders for use as an electrode material.

15 Claims, No Drawings

NICKEL POWDER FOR USE AS ELECTRODES IN BASE METAL ELECTRODE MULTILAYERED CERAMIC CAPACITORS

This is a United States national phase application of International application No. PCT/IB01/00434, filed Feb. 16, 2001, the benefit of the filing date of which is hereby claimed under 35 U.S.C. § 120, which in turn claims the benefit of U.S. provisional patent application No. 60/183,480 filed Feb. 18, 2000, the benefit of the filing date of which is hereby claimed under 35 U.S.C.

BACKGROUND OF THE INVENTION

The present invention provides for new and useful nickel powders particularly for use as an electrode material such as in Base Metal Electrode Multilayered Ceramic Capacitors (BME-MLCC).

In the manufacture of BME-MLCC's generally suitable pastes of metal powders and pastes of dielectric ceramic powders are alternatively laminated to form a multilayered structure of alternative metal powder layers and ceramic powder layers, wherein after sintering the metal powders layers form internal electrodes with a dielectric between each two electrodes.

Such capacitor structures conventionally are known as Precious Metal Electrode Multilayered Capacitors (PME-MLCC), when palladium or palladium-silver alloy powders have been used as the metal powder.

According to recent developments attempts have been made to substitute the precious metals palladium and silver by less precious metals such as copper and nickel.

A number of problems have been associated with using these less precious metals, predominantly the insufficient oxidation resistance during sintering in the presence of organic materials present in the pastes for providing laminating properties, and the shrinkage of the metal powders during sintering due to their lower softening temperature as compared to the aforementioned precious metal or precious metal alloy. Particularly shrinkage and multicrystallinity of the metal powder material leads to delamination of the multilayered structure during sintering and cracks in both, the dielectric and the electrode layers. The insufficient oxidation resistance of the metal powders leads to uncontrolled oxygen uptake with the inclusion of impurities such as carbon unless sintering is made in a protecting atmosphere, such as argon containing a reducing gas such as hydrogen.

Present attempts to overcome or reduce these drawbacks aim to reduce the impurity level and to increase the crystallinity of Ni and Cu powders, particularly to increase the crystal grain size of the powders to close to the powder particle size. However oxygen uptake, shrinkage, and as a consequence delamination and crack formation despite these efforts are still inferior as compared to precious metal electrodes. Particularly, shrinkage of known nickel powders upon sintering is inversely proportional with the particle size of the powder. Accordingly, it was not possible to use powders of diameter smaller than about 0.2 μm diameter without producing large numbers of capacitors with delamination and crack defects. Accordingly, presently known nickel powders impose a serious limitation to the tendency of miniaturization of BME-MLCC technology, considering that the minimum electrode layer thickness is about 2 to 3 times the average powder particle diameter.

SUMMARY OF THE INVENTION

One object of the invention is to provide a nickel powder of improved oxidation resistance, particularly of a nickel powder which upon heating to 420° C. in air suffers a weight gain of less than 2% b.wt. per m²/g specific surface area of the powder. Preferably the powders of the invention suffer a gain in weight of less than 1% b.wt. per m²/g specific surface area of the powder, measured according to the BET-method.

Another object of the invention is to provide a nickel powder of reduced shrinkage upon sintering. Particularly it is an object of the invention to provide for nickel powders which if formed into a green body and heated to 1000° C. suffers less than a percentage of volumetric shrinkage ("VS" in %) depending on mean particle diameter d determined by the following formula:

$$VS(\%) < 24 - d(nm)/30.$$

Another object of the invention is to provide nickel powder of mean particle diameter of 0.05 μm to 1.5 μm which suffers shrinkage of less than VS given above upon heating to 1000° C.

Another object of the invention is to provide for nickel powder of substantially spherical particle shape.

Another object of the invention is to provide for nickel powder of narrow particle size distribution.

Another object of the invention is to provide nickel powder of low impurity level and high crystallinity and of crystal size close to particle size.

These and other objects of the invention are met by nickel powders obtained from nickel vapour phase formation in a reducing/inert carrier gas at a temperature above 1000° C. and subsequent surface oxidation.

The nickel powder in accordance with the invention preferable has substantially spherical shape, a mean particle diameter of 0.05 to 1.5 μm, preferably 0.07 to 1.0 μm (based on surface area) and a narrow particle size distribution with geometrical standard deviation of <2.5.

Without wishing to be bound to any theory, it is believed that by the oxide surface layer of the nickel powder in accordance with the invention the softening temperature of the powder surface is increased, whereby deformation of the spherical particles at contact points during sintering is reduced and accordingly shrinkage is reduced during sintering. This effect becomes more pronounced as the particle diameter of the powder becomes smaller.

Preferably the surface oxygen of the nickel powder in accordance with the invention amounts to about between 0.5 mg and 5 mg oxygen per m² surface of the powder. Particularly preferred is a surface oxygen content of more than 1 mg per m² surface, also particularly preferred is an amount of less than 4 mg per m². The surface area is to be determined according to the BET method.

Preferably the surface oxygen of the nickel powder is present in the form of microcrystalline or amorphous NiO. The preferred amount of surface oxygen corresponds to about between 2 and 20 molecular surface layers of NiO, particularly preferred are 4 or more molecular surface layers. Particularly preferred are less than 8 molecular NiO surface layers.

Disregarding surface oxygen the nickel powders according to the invention have an impurity level of less than 1% b.wt., preferably less than 0.3% b.wt.

The total oxygen content of the powders of the invention is strongly dependent on particle size and accordingly on specific surface. For very small powders of mean diameter of 50 nm the total oxygen should be at least 1.3% b.wt. and may reach up to 10% b.wt. without disadvantage and contrary to the object of prior art to provide for nickel powders of highest possible purity. Total oxygen content of mean particle diameter of 0.1 μm is minimum 0.5% b.wt. and may reach 5% b.wt. Powder of mean particle diameter of 0.3 μm may have a total oxygen content of 0.2 to 2% b.wt.

The oxygen surface layer preferably is created on the freshly formed particles from nickel vapour when the particles still are entrained in the carrier gas. It is believed that the advanced suitability of the powders also results from specific forming conditions on freshly condensed nickel, probably still in the presence of nickel vapour.

The preferred process of manufacture of the powders of the invention is in accordance with the process disclosed in copending U.S. patent application Ser. No. 09/136,043 filed Aug. 18, 1998 or corresponding international patent application PCT/CA 99/00759, both incorporated herein by reference.

According to this preferred process of manufacture fine powders of nickel are produced by means of a transferred arc plasma system, which process comprises the steps of: (a) continuously providing a metal to be vapourized in a transferred arc plasma reactor; (b) striking an arc between the metal and a non-consumable electrode in a straight polarity configuration to generate a plasma having a temperature sufficiently high to vapourize the metal and form a vapour thereof; (c) injecting a diluting gas heated to a temperature of at least 1000 K into the plasma reactor; (d) transporting the vapour by means of the plasma gas and the diluting gas (both designated as carrier gas) into a thermostatisized tube wherein the temperature is controlled at between 1000 and 1500° C. to control particle growth and crystallization during passage of the carrier gas through the tube; (e) introducing the carrier gas with entrained nickel particles into a quench tube with injection of a cooling fluid directly into the carrier gas, preferably in a sequence of cooling fluid inlets along the quench tube; (f) introducing oxygen in amount sufficient to effect surface oxidation of the entrained nickel powders as an additive to the quench fluid supplied to at least at the first cooling fluid inlet; and (g) separating the powder particles from the carrier gas and the cooling fluid.

Preferably the plasma gas, the diluting gas and the cooling fluid are argon, nitrogen or other inert gas or inert gas mixture. Argon is the preferred gas.

Preferably the plasma gas provides for reducing atmosphere by containing about 10 to 40 vol. % of hydrogen.

DETAILED DESCRIPTION OF THE INVENTION

The invention is described in more detail by means of the following examples:

In a reactor disclosed in copending U.S. application Ser. No. 09/136,043 titled. "Method and transferred arc plasma system for production of fine and ultrafine powders" filed Aug. 18, 1998 and corresponding international patent application PCT/CA 99/00759 nickel was vapourized by striking a plasma arc on a crucible containing ultra pure nickel metal using 99.999% argon as the plasma gas and as the diluting gas to give a nickel vapour pressure in the carrier gas as indicated in the following table, col. I. The temperature of the wall of the thermostatisized tube and the residence time of the carrier gas in that tube are given in col. II and col. III of table 1 respectively. Col. IV gives the volume ratio of the cooling fluid (argon, introduced via 4 stages into the quench tube) and the carrier gas. Col. V gives the oxygen percentage of the cooling fluid. Col. VI presents the mean particle size of nickel powder separated downstream the quench tube and col. VII presents the total oxygen content of the powder.

Nickel vapour content has been calculated from the amount of vapourized nickel and supplied gas. Residence time has been calculated from the inner volume of the thermostatisized tube and the gas flow at normal conditions. Pressure in the reactor was slightly above normal pressure.

TABLE 1

| Example No. | I Ni-vapour in carrier gas vol.-% | II res. time sec. | III temp. ° C. | IV cooling fluid ratio | V oxygen in cooling fl. vol.-% | VI particle size μm | VII oxygen content wt.-% |
|---|---|---|---|---|---|---|---|
| comp. | 0.7 | 0.15 | 1410 | 1.25 | 0 | 0.195 | 0.8 |
| 1 | 0.56 | 0.15 | 1420 | 1.25 | 1.1 | 0.098 | 6.3 |
| 2 | 0.70 | 0.15 | 1410 | 1.25 | 1.3 | 0.205 | 3.1 |
| 3 | 0.23 | 0.13 | 1430 | 2.22 | 0.5 | 0.312 | 1.8 |
| 4 | 0.16 | 0.13 | 1440 | 2.22 | 0.4 | 0.368 | 1.4 |

From a sample of each of the powders a paste is prepared by using a sugar solution. The sugar content of the paste was 2% b.wt. The paste is filled into a mould and dried to give a green body. Thereafter the green body is slowly heated to 400° C. and thereafter to 1000° C. at a rate of 5 K/min, and thereafter cooled down to room temperature. Shrinkage is measured as the difference in volume of the green body and the sintered body.

The powders according to the invention, when formed into a green body and heated at 5 K/min, suffer a shrinkage of 10% at a temperature preferably above $T_{10}$ depending on particle size according to the following formula:

$$T_{10}(°C.) > 660 + 800 \times d(\mu m),$$

particularly preferred $$T_{10}(°C.) > 680 + 800 \times d(\mu m).$$

Another sample of each powder is heated to 420° C. at a rate of 5 K/min. While air is admitted to determine the weight gain.

TABLE 2

| | | Ex. No. | | | | |
|---|---|---|---|---|---|---|
| | | comp | 1 | 2 | 3 | 4 |
| shrinkage at 1000° C. | vol.-% | 28 | 19.8 | 16.4 | 13.2 | 11.1 |
| shrinkage 10% at temp. | ° C. | 620 | 723 | 812 | 896 | 940 |
| weight gain | wt. % | 6 | 8.4 | 3.6 | 3.5 | 2.1 |

The invention claimed is:

1. A process for the manufacture of a nickel powder, wherein nickel powder particles are oxidized on their surface by means of a transferred arc plasma system, the process comprising the steps of:
    (a) continuously providing nickel in a transferred arc plasma reactor;
    (b) striking an arc between the nickel and a non-consumable electrode in a straight polarity configuration to generate a plasma gas having a temperature sufficiently high to vaporize the nickel and form a vapor thereof;

(c) injecting a diluting gas heated to a temperature of at least 1000 K into the plasma reactor;

(d) transporting the vapor by means of a carrier gas comprising the plasma gas and the diluting gas into a thermostatisized tube wherein the temperature is controlled at between 1000 and 1500° C. to control particle growth and crystallization during passage of the carrier gas through the tube;

(e) introducing the carrier gas with entrained nickel particles into a quench tube with injection of a cooling fluid directly into the carrier gas through one or more cooling fluid inlets along the quench tube;

(f) introducing oxygen in an amount sufficient to effect surface oxidation of the entrained nickel powder particles as an additive to the cooling fluid supplied to a first of the one or more cooling fluid inlets; and (g) separating the nickel powder from the carrier gas and the cooling fluid.

2. A process for preparing a nickel powder having a surface layer of between about 2 and 20 molecular layers of an approximate composition of NiO, the process comprising the steps of:

(a) continuously providing nickel in a transferred arc plasma reactor;

(b) striking an arc between the nickel and a non-consumable electrode in a straight polarity configuration to generate a plasma gas having a temperature sufficiently high to vaporize the nickel and form a vapor thereof;

(c) injecting a diluting gas heated to a temperature of at least 1000 K into the plasma reactor;

(d) transporting the vapor by means of a carrier gas comprising the plasma gas and the diluting gas into a thermostatisized tube wherein the temperature is controlled at between 1000 and 1500° C. to control particle growth and crystallization during passage of the carrier gas through the tube;

(e) introducing the carrier gas with entrained nickel particles into a quench tube with injection of a cooling fluid directly into the carrier gas through one or more cooling fluid inlets along the quench tube;

(f) introducing oxygen in an amount sufficient to effect surface oxidation of the entrained nickel powder particles as an additive to the cooling fluid supplied to a first of the one or more cooling fluid inlets; and (g) separating the nickel powder from the carrier gas and the cooling fluid.

3. The process according to claim 2, wherein the nickel powder has a substantially spherical particle shape and a mean particle diameter of 0.05 to 1.5 μm.

4. The process according to claim 3, wherein the mean particle diameter is 0.07 to 1 μm.

5. The process according to claim 2, wherein the nickel powder has, disregarding surface oxygen, at least 99% by weight of Ni.

6. The process according to claim 2, wherein the nickel powder has, following forming a green body and heating to 1000° C., a volumetric shrinking (VS) of less than 24-d/30, wherein d is mean particle diameter in nm.

7. The process according to claim 2, wherein the nickel powder has, following forming a green body and heating, a shrinking of 10% at a temperature above $$T_{10}(° C.)>660+800\times d(\mu m),$$

wherein d(μm) is average particle diameter in micrometers.

8. The process according to claim 2, wherein the nickel powder has, upon heating in air to a temperature of 420° C., a weight gain of less than 2% by weight per m²/g of specific surface.

9. A process for preparing a nickel powder having a surface oxygen content of between about 0.5 and 5 mg oxygen per m² powder particle surface, the process comprising the steps of:

(a) continuously providing nickel in a transferred arc plasma reactor;

(b) striking an arc between the nickel and a non-consumable electrode in a straight polarity configuration to generate a plasma gas having a temperature sufficiently high to vaporize the nickel and form a vapor thereof;

(c) injecting a diluting gas heated to a temperature of at least 1000 K into the plasma reactor;

(d) transporting the vapor by means of a carrier gas comprising the plasma gas and the diluting gas into a theremostatisized tube wherein the temperature is controlled at between 1000 and 1500° C. to control particle growth and crystallization during passage of the carrier gas through the tube;

(e) introducing the carrier gas with entrained nickel particles into a quench tube with injection of a cooling fluid directly into the carrier gas through one or more cooling fluid inlets along the quench tube;

(f) introducing oxygen in an amount sufficient to effect surface oxidation of the entrained nickel powder particles as an additive to the cooling fluid supplied to a first of the one or more cooling fluid inlets; and (g) separating the nickel powder from the carrier gas and the cooling fluid.

10. The process according to claim 9, wherein the nickel powder has a substantially spherical particle shape and a mean particle diameter of 0.05 to 1.5 μm.

11. The process according to claim 10, wherein the mean particle diameter is 0.07 to 1 μm.

12. The process according to claim 9, wherein the nickel powder has, disregarding surface oxygen, at least 99% by weight of Ni.

13. The process according to claim 9, wherein the nickel powder has, following forming a green body and heating to 1000° C., a volumetric shrinking (VS) of less than 24-d/30, wherein d is mean particle diameter in nm.

14. The process according to claim 9, wherein the nickel powder has, following forming a green body and heating, a shrinking of 10% at a temperature above $$T_{10}(° C.)>660+800\times d(\mu m),$$

wherein d(μm) is average particle diameter in micrometers.

15. The process according to claim 9, wherein the nickel powder has, upon heating in air to a temperature of 420° C., a weight gain of less than 2% by weight per m²/g of specific surface.

* * * * *